US010592374B2

(12) United States Patent
Meaney et al.

(10) Patent No.: US 10,592,374 B2
(45) Date of Patent: *Mar. 17, 2020

(54) REMOTE SERVICE FAILURE MONITORING AND PROTECTION USING THROTTLING

(71) Applicant: Amazon Technologies, Inc., Seattle, WA (US)

(72) Inventors: Michael Patrick Meaney, Dublin (IE); Ian McGarry, Dublin (IE); James William Horsley, Christchurch (GB); Tamas Polyak, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/981,799

(22) Filed: May 16, 2018

(65) Prior Publication Data

US 2018/0260290 A1    Sep. 13, 2018

Related U.S. Application Data

(63) Continuation of application No. 14/580,013, filed on Dec. 22, 2014, now Pat. No. 9,983,955.

(51) Int. Cl.
  *G06F 11/30* (2006.01)
  *G06F 11/07* (2006.01)
  *G06F 11/00* (2006.01)

(52) U.S. Cl.
  CPC ........ *G06F 11/3006* (2013.01); *G06F 11/004* (2013.01); *G06F 11/076* (2013.01); *G06F 11/0793* (2013.01); *G06F 2201/875* (2013.01)

(58) Field of Classification Search
  CPC ............................ G06F 11/30; G06F 11/3006
  USPC ........................................................ 714/47.1
  See application file for complete search history.

(56) References Cited

U.S. PATENT DOCUMENTS

| 7,430,590 | B1 * | 9/2008 | Rive ....................... H04L 29/06 709/203 |
| 7,840,653 | B1 * | 11/2010 | Cortes, Jr. ........... H04L 41/0816 709/220 |
| 8,266,258 | B1 | 9/2012 | Cortes, Jr. et al. |
| 8,667,101 | B1 | 3/2014 | Cortes, Jr. et al. |
| 8,812,661 | B2 | 8/2014 | Garcia et al. |
| 9,983,955 | B1 | 5/2018 | Meaney et al. |

(Continued)

*Primary Examiner* — Kamini B Patel
(74) *Attorney, Agent, or Firm* — Knobbe, Martens, Olson & Bear, LLP

(57) ABSTRACT

A computer-implemented failure monitoring system and method are used with at least one server and with a plurality of resource servers. The system includes a computer storage device that stores one or more failure parameters indicative of one or more failure conditions. The system further includes one or more computer processors that include a monitoring component, an analysis component, and a throttling component. The monitoring component obtains information regarding service requests transmitted by the at least one server for which corresponding responses have not been timely received. The analysis component compares the information to the one or more failure parameters and determines whether at least one failure condition exists. The throttling component selectively inhibits transmission of service requests corresponding to the at least one failure condition while the at least one failure condition exists.

22 Claims, 3 Drawing Sheets

(56) References Cited

U.S. PATENT DOCUMENTS

| | | | |
|---|---|---|---|
| 2002/0131369 A1* | 9/2002 | Hasegawa | H04L 41/12 370/241 |
| 2005/0213507 A1* | 9/2005 | Banerjee | H04L 41/0806 370/241 |
| 2010/0046375 A1* | 2/2010 | Goldstein | H04L 41/0631 370/237 |
| 2013/0046879 A1* | 2/2013 | Garcia | H04L 43/0811 709/224 |
| 2014/0337518 A1 | 11/2014 | Garcia et al. | |
| 2015/0277964 A1* | 10/2015 | Atkins | G06Q 40/00 718/101 |

* cited by examiner

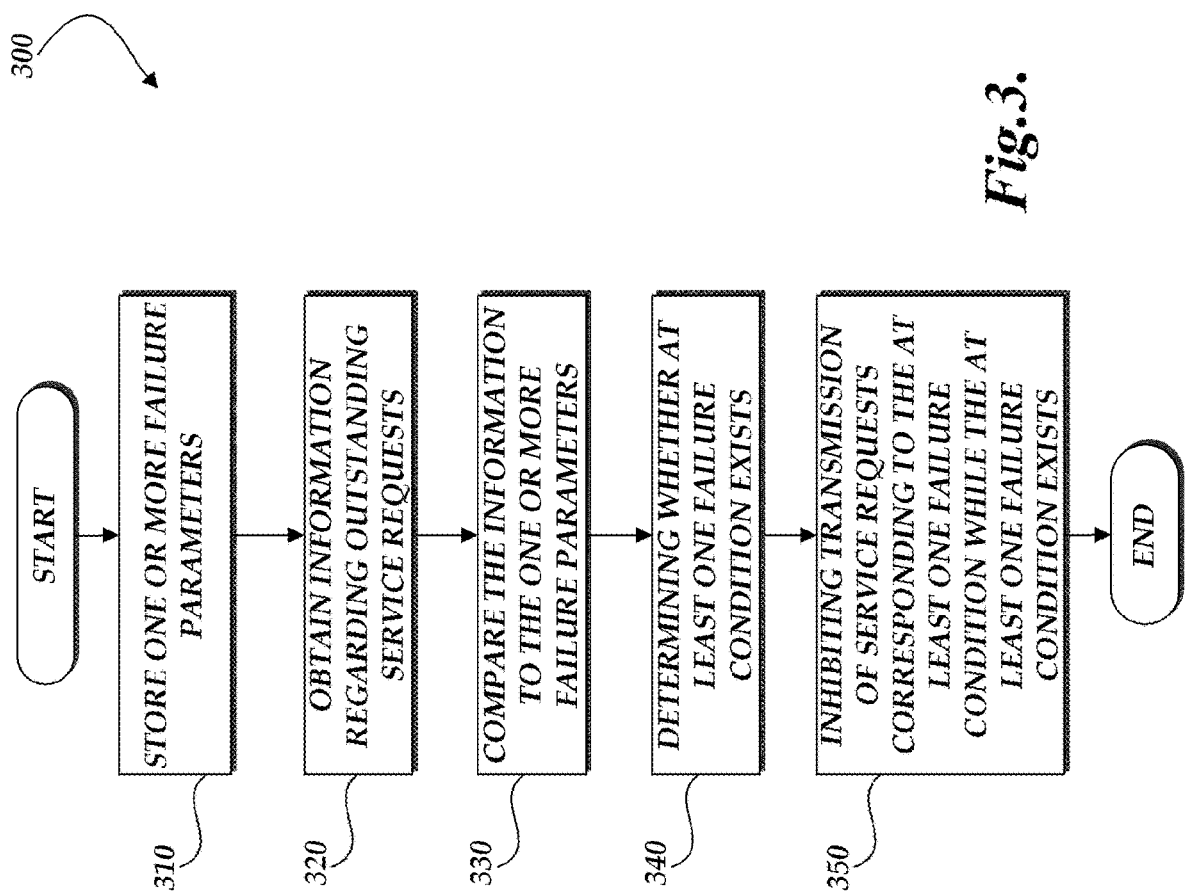

REMOTE SERVICE FAILURE MONITORING AND PROTECTION USING THROTTLING

CROSS-REFERENCE TO RELATED APPLICATION

This application is a continuation of U.S. patent application Ser. No. 14/580,013, entitled REMOTE SERVICE FAILURE MONITORING AND PROTECTION USING THROTTLING, and filed on Dec. 22, 2014, the entirety of which is incorporated by reference herein.

BACKGROUND

Organizations may operate computer networks that interconnect numerous computing systems to support the operations of the organizations. The computing systems may be co-located, or part of a local network, or the computing systems may be distributed across multiple distinct geographical locations and include one or more private or public networks. For example, some organizations make use of data centers that may house large amounts of data for the organization. The data centers may be part of an organization's local network, or the organization may utilize a data center that in a separate geographical location. Further, the data center itself may be implemented as a co-located computing system or it may be a distributed across one or more private or public networks.

BRIEF DESCRIPTION OF THE DRAWINGS

The disclosed embodiments will become more readily appreciated as the same become better understood by reference to the following detailed description, when taken in conjunction with the accompanying drawings, wherein:

FIG. 3 is a flow diagram of an example computer-implemented failure monitoring method compatible with certain embodiments described herein.

DETAILED DESCRIPTION

Figure 1:
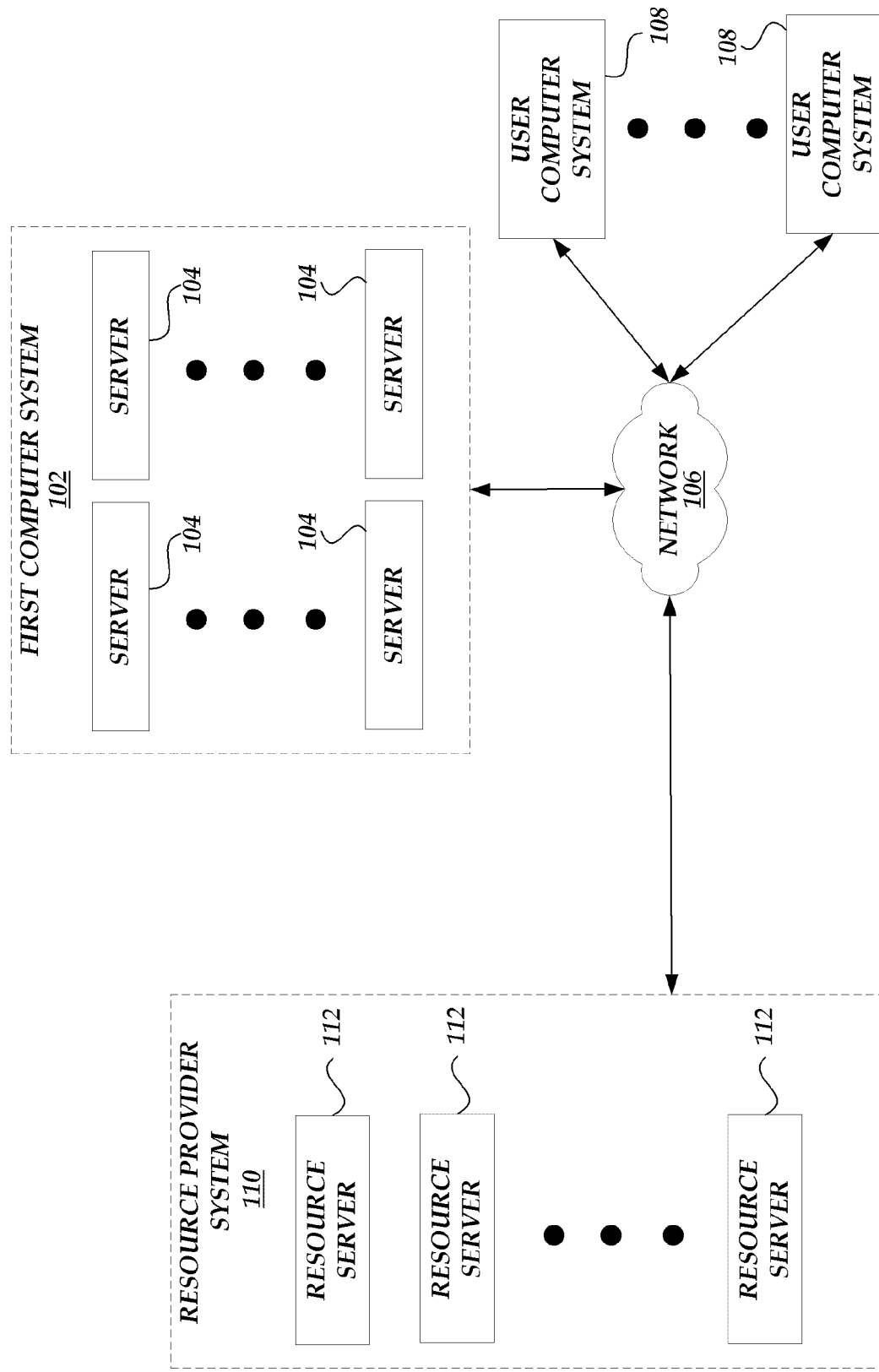
FIG. 1 schematically illustrates an example configuration in which a first computer system has at least one server and is configured to communicate with a plurality of second computer systems and with a resource provider system having a plurality of resource servers configured to provide one or more services to the first computer system.

Certain embodiments described herein provide a system, a method, or both, for protecting a computer system (e.g., a customer computer system) from degradation of operation from not receiving responses to service requests sent by the computer system to a resource provider system. For example, the service requests from the computer system to a resource provider system that are in one or more categories which are identified as experiencing a failure condition can be throttled, thereby allowing other service requests from the computer system to be transmitted to and acted upon by the resource provider system. In this way, the computer system can be protected from being brought down by a single malfunctioning server of the resource provider system.

Resource providers, for example a company or a public sector organization, may set up at least one resource provider system to provide one or more virtualization services accessible via a computer network to a distributed set of customers. A resource provider system may include one or more data centers hosting various resource pools, such as collections of physical servers for hosting services on behalf of customers, storage devices, database services, networking equipment and the like, used to implement and distribute the infrastructure applications and services offered by the resource provider.

Organizations may also utilize virtualization technologies for creating dynamically scalable computing systems. Through the use of virtualization technologies, organizations need not purchase dedicated hardware for processing. Rather, the organization may purchase computing resources on an as-needed basis from a computing resource service provider. For example, virtualization technologies may allow a single physical computing machine to be shared among multiple users by providing each user with one or more virtual machines hosted by a single physical computing machine. Each virtual machine may be a software simulation acting as a distinct logical computing system that provides users with the illusion that they are the sole operators and administrators of a given hardware computing resource. In addition, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store that provides users with the illusion that they are the sole operators and administrators of the data storage resource.

The computing resources of the resource provider system can comprise one or more resource servers that may, in some embodiments, provide services (e.g., capabilities) to clients. For example, the resource provider system can provide one or more virtual machines (e.g., run directly on the physical hardware of a server) that a customer may use to perform computing tasks or execute business applications. For another example, the resource provider system can provide infrastructure applications (e.g., applications, libraries, development tools, etc.) or computing services (e.g., payment processing services; database services) to customers to provide a platform for their business applications. For example, a customer may have a business application consisting of an e-commerce store front. The customer may purchase one or more infrastructure applications, such as pre-configured web-servers, database servers, and/or third-party user interface libraries for the resource provider system to execute with its resource servers. In certain embodiments, the virtual machine or the infrastructure application provided by the resource provider system can be accessed by the customer via one or more application program interfaces (APIs) provided by the resource provider system.

The services provided by a resource provider system can be collectively referred to as "backend services," and may be implemented, for example, by one or more resource servers of the resource provider system with a specified computational capacity (e.g., processing speed, number of CPUs, memory size, storage size, bandwidth etc.), a single hardware computing device, or may be implemented as software executing on one or more hardware computing devices. A backend service may also include an operating system and one or more applications. For example, the backend service may execute an operating system that itself executes various software applications such as database components, data processing components, or web server components.

Thus, to a customer, a resource server providing a backend service may be viewed as one, dedicated, computing device, although in implementation, the customer may be sharing a hardware computing device with other customers (each customer being provided with their own backend service). Alternatively, a resource server providing a backend service may be viewed by a customer as a single, dedicated, computing device although it may be implemented across several hardware computing devices. By offering customers virtual-machine backend services, a resource provider system can maximize the hardware computing devices to satisfy a large number of customers in a more efficient manner than if each customer was operating its own hardware computing device.

In some embodiments a customer or user may be provided direct access to a backend service, e.g., by giving a user an administrator login and password. In other embodiments, the resource provider system may allow clients to specify execution requirements for specified client applications, and schedule execution of the applications on behalf of the client on execution platforms (such as application server instances, Java™ virtual machines (JVMs), general purpose or special-purpose operating systems, or high-performance computing platforms) suitable for the applications, without for example requiring the client to access a backend service or an execution platform directly. A given execution platform may utilize one or more backend services in some implementations; in other implementations multiple execution platforms may be mapped to a single backend service. Resource provider systems may, in some cases, utilize a flexible set of resource reservation, control and access interfaces for their customers (e.g., a reservation interface including a resource catalog from which the customer can purchase selected backend services).

FIG. 1 is a block diagram illustrating an example configuration of an overall system compatible with certain embodiments described herein in which a first computer system 102 (e.g., a customer computer system running a website) has at least one server 104 and is configured to communicate (e.g., via a network 106) with a plurality of second computer systems 108 (e.g., user computer systems) and with a resource provider system 110 having a plurality of resource servers 112 configured to provide one or more services to the first computer system 102. While FIG. 1 shows a single resource provider system 110, the first computer system 102 may be configured to communicate with multiple resource provider systems 110.

The first computer system 102, the second computer systems 108, and/or the resource provider system 110 can be effectuated by computer systems that include a CPU, I/O devices, storage, and memory. The I/O devices can include a display, a network connection to the network 106, a computer-readable media drive, and other I/O devices (e.g., a keyboard, a mouse, speakers, etc.). In some embodiments, the first computer system 102, the second computer systems 108, and/or the resource provider system 110 can be executed or embodied by one or more physical or virtual computing systems.

The system can include a network 106 which can, for example, be a publicly accessible network of linked networks, such as the Internet, possibly operated by various distinct parties. In other embodiments, the network 106 can be a private network, such as, for example, a corporate or university network that is wholly or partially inaccessible to non-privileged users. In still other embodiments, the network 106 can include one or more private networks with access to and/or from the Internet. Moreover, the network 106 may be any wired network, wireless network, or combination thereof. In addition, the network 106 may be a personal area network, local area network, wide area network, cable network, satellite network, cellular telephone network, etc., or any combination thereof. Protocols and components for communicating via the Internet or any of the other aforementioned types of communication networks are well known to those skilled in the art of computer communications and, thus, need not be described in more detail herein.

The system can include a resource provider system 110 which may be a computer system, such as a server computer, that communicates with the first computer system 102 to provide computing resources to the first computer system 102. The resource provider system 110 can be stored as one or more executable program modules in the memory of one or more resource servers 112, and can interact with each other and the first computer system 102 and the second computer systems 108 over the network 106. The resource provider system 110 can comprise one or more data stores which may be part of, or co-located with, the resource servers 112, or may be remotely accessed by the resource provider system 110 and/or may be implemented as a web service. In an embodiment, the resource provider system 110 may also be a group of computer systems (e.g., servers) that operate together to effectuate a resource providing service by providing resources running one or more infrastructure applications and/or utilizing one or more services. As such, some of the functions described with respect to the resource provider system 110 may be distributed across multiple computer systems. While FIG. 1 shows the resource provider system 110 as a separate computing system in communication with the first computer system 102 via the network 106, in other embodiments, the functions and the operations of the resource provider system 110 may be performed virtually by the first computer system 102.

Each of the second computer systems 108 can be running a web browser configured to interact with a website of the one or more servers 104 of the first computer system 102. The at least one server 104 can generate service requests for transmission to the resource provider system (e.g., via the network 106). The at least one server 104 can be programmed to simultaneously handle a maximum number of service requests at one time (e.g., 100 service requests). During a non-failure condition, each of the service requests generated by the at least one server 104 is transmitted by the at least one server 104 to one or more resource servers 112 (e.g., via the network 106) of a resource provider system 110, and the one or more resource servers 112 receive the transmitted service request and respond by transmitting a corresponding response to the at least one server 104 (e.g., within a predetermined time period). Under such a non-failure condition, the number of service requests simultaneously awaiting responses is less than the maximum number of service requests that can be simultaneously handled by the at least one server 104 (e.g., the total capacity of the at least one server 104 for simultaneous service requests).

However, under some conditions, one or more of the resource servers 112 cannot be contacted (e.g., the resource server 112 fails to timely receive service requests from the at least one server 104, perhaps due to a problem with a portion of the network 106 across which the service request is attempted to be transmitted) or one of the resource servers 112 fails to respond timely to service requests received from the at least one server 104 (e.g., due to a problem with the resource server 112). As a result, the at least one server 104 does not receive a timely response from the resource server 112 corresponding to the service request, and the service request remains outstanding while the at least one server 104 waits for the corresponding response from the resource server 112. Various failure conditions can occur when one or more services, geographic regions, or APIs of the resource provider system 110 are having issues that result in long running service requests (e.g., socket timeouts), risking a console outage of the first computer system 102 due to the maximum number of service request connections being used up and causing an outage of varying severity. Under an example failure condition, the number of outstanding service requests from the at least one server 104 to the at least one resource provider system 110 can build up to equal or exceed the maximum number of service requests that can be simultaneously handled by the at least one server 104.

For example, if one resource server 112 is malfunctioning such that it cannot timely respond to service requests, each of the service requests transmitted by a server 104 to the malfunctioning resource server 112 will remain outstanding, such that most, if not all, of the simultaneous service requests being handled by the server 104 are outstanding service requests transmitted to the malfunctioning resource server 112. As a result of the number of outstanding service requests being handled by the server 104 equaling or exceeding the maximum number of simultaneous service requests, the server 104 is unable to transmit further service requests not only to the malfunctioning resource server 112 but to all the other resource servers 112 of the at least one resource provider system 110. In some such circumstances, the malfunctioning resource server 112 may be one which is not particularly important to the operation of the first computer system 102 (e.g., providing an advertisement delivery service for a retail website), yet the malfunctioning resource server 112 is preventing the first computer system 102 from performing other operations that utilize service requests transmitted to other resource servers 112. Thus, a single malfunctioning resource server 112, despite its importance to the overall operation of the first computer system 102, can bring down the operations of the first computer system 102.

For another example, a first computer system 102 (e.g., located in the United States) can transmit service requests (e.g., via various APIs) to a resource provider system 110 (e.g., a cloud computing network) that comprises a plurality of resource servers 112 in various geographic regions of the world (e.g., one of which can be Brazil for the purposes of this example). Upon conditions under which there is significant packet loss of internet traffic from the first computer system 102 to a resource server 112 in a particular region (e.g., loss of packets transmitted from the United States to Brazil), outstanding service requests by a server 104 of the first computer system 102 to the resource server 112 can stack up, to the point where all the processing threads of the server 104 are stuck awaiting responses from the resource server 112 in Brazil. Thus, the server 104 can no longer transmit service requests to the resource provider system 110, bringing down the operations of the first computer system 102, even though it is only communications with a single resource server 112 that are experiencing difficulty. Such a failure condition can be particularly frustrating when the resource server 112 is in a geographic region that is less important than other geographic regions.

Figure 2:
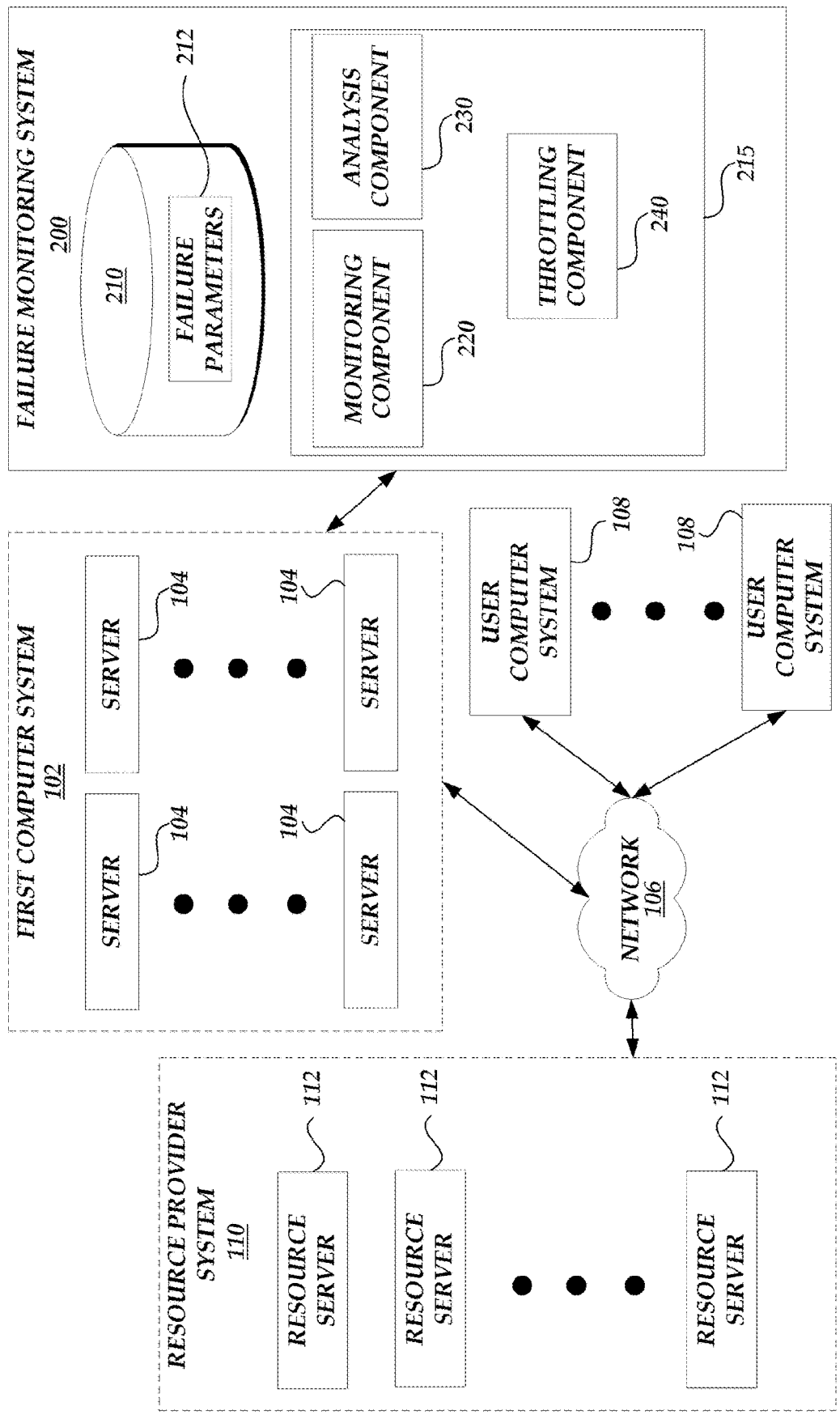
FIG. 2 schematically illustrates an example computer-implemented failure monitoring system configured to be used in conjunction with a first computer system having at least one server in accordance with certain embodiments described herein.

FIG. 2 schematically illustrates an example computer-implemented failure monitoring system 200 configured to be used in conjunction with a first computer system 102 having at least one server 104 in accordance with certain embodiments described herein. The first computer system 102 is configured to communicate (e.g., via a network 106) with a plurality of second computer systems 108 (e.g., user computer systems) and with at least one resource provider system 110 (e.g., via the network 106) having a plurality of resource servers 112 configured to provide one or more services to the first computer system 102. The computer-implemented failure monitoring system 200 comprises a computer storage device 210 operative to store one or more failure parameters 212 that are indicative of one or more failure conditions. The computer-implemented failure monitoring system 200 further comprises one or more computer processors 215 which comprise a monitoring component 220 operative to obtain information regarding service requests transmitted by the at least one server 104 to the at least one resource provider system 110 for which corresponding responses have not been timely received by the at least one server 104 from the at least one resource provider system 110. The one or more computer processors 215 further comprise an analysis component 230 operative to compare the information to the one or more failure parameters and to determine whether at least one failure condition exists. The one or more computer processors 215 further comprise a throttling component 240 operative to prevent service requests corresponding to the at least one failure condition from being transmitted by the at least one server 104 while the at least one failure condition exists The failure monitoring system 200 can comprise hardware (e.g., a server computing device comprising the computer storage device 210 and the one or more computer processors 215), software (e.g., software configured to run on one or more processors of a server computing device), or both. In certain embodiments, the failure monitoring system 200 can be located within the first computer system 102 (e.g., within one or more of the servers 104 or within a separate computing device of the first computer system 102 that is dedicated to providing a failure monitoring capability for the one or more servers 104). For example, the failure monitoring system 200, in some embodiments, may include software code that, when executed, instructs a computer device (e.g., a server 104) to perform the operations of the failure monitoring system 200 as described herein. For example, the failure monitoring system 200 can be manifested in computer code which, when executed by a processor (e.g., of the server 104) is usable by the server 104 that is sending service requests to a resource provider system 110. In certain embodiments, the computer code manifesting the failure monitoring system 200 can be "orthogonal" to the software corresponding to the operation of the server 104 (e.g., the code does not change the logic of the software corresponding to the operation of the server 104; the code can be non-intrusive) and/or can be packaged as a portion of a library that can be accessed by any server 104 of the first computer system 102. In certain other embodiments, the failure monitoring system 200 can be located within a separate computing device that is dedicated to providing a failure monitoring capability for the one or more servers 104 and configured to communicate with the first computer system 102 directly (e.g., as schematically illustrated by FIG. 2) or configured to communicate with the first computer system 102 via the network 106. In still other certain embodiments, each server 104 of the first computer system 102 can comprise a failure monitoring system 200 dedicated to providing a failure monitoring capability to the server 104 containing the failure monitoring system 200.

The components of the failure monitoring system 200 (e.g., the storage device 210, the one or more processors 215, the monitoring component 220, the analysis component 230, and the throttling component 240) can be dedicated for use in conjunction with the failure monitoring system 200 or one or more of the components of the failure monitoring system 200 can be shared with other capabilities of the computing device in which the components of the failure monitoring system 200 reside. For example, in embodiments in which the failure monitoring system 200 is within a server 104 of the first computer system 102, the storage device 210 can be configured to be used as computer storage for other capabilities of the server 104 as well as for the failure monitoring system 200, and the monitoring component 220, the analysis component 230, and the throttling component 240 can be portions of one or more processors of the server 104 that are used for processing capabilities of the server 104 as well as for the failure monitoring system 200.

In certain embodiments, the storage device 210 can comprise a storage device of a server computing device (e.g., a server 104 in which the failure monitoring system 200 is manifested). The storage device 210 can comprise permanent or semi-permanent storage integrated within the server computing device, or network accessible storage. In other embodiments, the storage device 210 can comprise removable or temporary storage. The one or more computer processors 215 can be in operative communication with the storage device 210 and can be configured to provide the monitoring component 220, the analysis component 230, and the throttling component 240 as described herein.

The failure parameters 212 stored by the storage device 210 can comprise potential failure parameters that are indicative of one or more failure conditions for various categories regarding the outstanding service requests of a server 104 being monitored by the failure monitoring system 200 (e.g., a failure condition exists if the number of outstanding service requests of the server 104 is equal to or greater than the corresponding failure parameter). For example, the failure parameters 212 can comprise a maximum number of the total outstanding service requests for which the server 104 has not timely received responses such that the server 104 is simultaneously awaiting responses (e.g., 100 service requests). This maximum number can represent the total capacity of the server 104 (e.g., the total capacity of the server 104 for outstanding service requests transmitted by the server 104).

For another example, the failure parameters 212 can comprise one or more of the following: a maximum number of outstanding service requests transmitted by the server 104 to a predetermined resource provider system 110; a maximum number of outstanding service requests transmitted by the server 104 to a predetermined group of resource servers 112 (e.g., to resource servers 112 in a predetermined geographic region of the world); a maximum number of outstanding service requests transmitted by the server 104 for a predetermined type of service; a maximum number of outstanding service requests transmitted by the server 104 to a predetermined group of resource servers 112 for a predetermined type of service (e.g., to resource servers 112 in a predetermined geographic region of the world for a predetermined type of service); a maximum number of outstanding service requests transmitted by the server 104 to each API of a predetermined resource provider system 110; a maximum number of outstanding service requests transmitted by the server 104 to each API of a predetermined resource provider system 110 in a predetermined geographic region of the world.

For another example, the failure parameters 212 can comprise one or more of the following: a maximum percentage of the total capacity of the server 104 going to a predetermined resource provider system 110; a maximum percentage of the total capacity of the server 104 going to a predetermined group of resource servers 112 (e.g., to resource servers 112 in a predetermined geographic region of the world); a maximum percentage of the total capacity of the server 104 for a predetermined type of service; a maximum percentage of the total capacity of the server 104 going to a predetermined group of resource servers 112 for a predetermined type of service (e.g., to resource servers 112 in a predetermined geographic region of the world for a predetermined type of service); a maximum percentage of the total capacity of the server 104 going to each API of a predetermined resource provider system 110; a maximum percentage of the total capacity of the server 104 going to each API of a predetermined resource provider system 110 in a predetermined geographic region of the world. In certain other embodiments, a maximum ratio of the outstanding service requests in a category to the maximum number of the total outstanding service requests transmitted by the server 104 can be used as a failure parameter.

In certain embodiments, at least some of the failure parameters 212 for various categories can have values that are predetermined (e.g., set by an operator of the failure monitoring system 200). In certain other embodiments, at least some of the failure parameters 212 for various categories can have values that are dynamically set in response to one or more of the following: the monitored performance of the at least one resource provider system 110; the monitored performance of the first computer system 102; the monitored performance of the network 106; the number of second computer systems 108 using the first computer system 102; the types of services being requested. For example, in situations in which more second computer systems 108 are using the first computer system 102, there can be more service requests being made by the servers 104 to the resource servers 112, so the total capacity of the servers 104 for outstanding service requests can be increased to reflect the increased bandwidth being used. For another example, service requests for accessing data may be more highly valued than service requests for status queries, so the fraction of the total capacity of the servers 104 for outstanding service requests dedicated to data acquisition can be larger than the fraction of the total capacity of the servers 104 for outstanding service requests dedicated to status queries. In certain embodiments, at least one failure parameter 212 can be set at a value that avoids unnecessary throttling of service requests.

The monitoring component 220 can be configured to obtain information regarding service requests transmitted by the at least one server 104 to the resource provider system 110 for which corresponding responses have not been timely received by the at least one server 104 from the resource provider system 110 (e.g., received late or not at all). In certain embodiments, a server 104 of the first computer system 102 can comprise a computer memory (e.g., cache) in which is stored information regarding each outstanding service request transmitted by a server 104 to the at least one resource provider network 110 (e.g., the service requests for which corresponding responses have not yet been received by the at least one server 104 from the at least one resource provider system 110), and the monitoring component 220 can monitor this computer memory of the server 104 and can access some or all of the information regarding the outstanding service requests. In certain other embodiments, the monitoring component 220 can automatically detect service requests transmitted from the server 104 to the at least one resource provider system 110 and the corresponding responses received by the server 104, and can monitor these service requests and corresponding responses to generate information regarding the outstanding service requests. The monitoring component 220 can obtain at least some of the information by calculating one or more numbers of outstanding service requests (e.g., service requests transmitted by the server 104 to the resource provider system 110 for which responses have not yet been received by the server 104 from the resource provider system 110) in one or more categories of service requests. For example, the monitoring component 220 can increment a count of outstanding service requests in a category when a service request in the category is transmitted, and until a response corresponding to the service request is received. Upon receiving the response corresponding to the service request, the monitoring component 220 can decrement the count of outstanding service requests in the category.

The monitoring component 220, in some embodiments, may include software code that, when executed (e.g., by the one or more computer processors 215), instructs a computer device to perform the operations of the monitoring component 220 as described herein. For example, the monitoring component 220 can be manifested in computer code which, when executed by a processor (e.g., of the server 104), intercepts outgoing service requests from the server 104, extracts the desired information regarding these outgoing service requests, intercepts incoming responses from the at least one network provider network 110, and correlates the incoming responses to the outgoing service requests to determine the outstanding service requests. In certain embodiments, the computer code manifesting the monitoring component 220 can be "orthogonal" to the software corresponding to the operation of the server 104 (e.g., the code does not change the logic of the software corresponding to the operation of the server 104; the code can be non-intrusive) and/or can be packaged as a portion of a library that can be accessed by any server 104 of the first computer system 102.

The information obtained by the monitoring component 220 regarding an outstanding service request can further include one or more of the following: a type of service being requested by the outstanding service request; an identity of the resource provider system 110 to which the outstanding service request was sent; an identity of the one or more resource servers 112 to which the outstanding service request was sent; an identity of a predetermined group of resource servers 112 to which the outstanding service request was sent (e.g., an identity of the geographic region of the world in which resides the resource servers 112 to which the outstanding service request was sent); an identity of an API of the resource provider system 110 to which the outstanding service request was sent.

In certain embodiments, the monitoring component 220 is configured to calculate one or more numbers of the outstanding service requests of the at least one server 104 in one or more different categories, depending on the information obtained regarding the outstanding service requests. For example, the monitoring component 220 can calculate one or more of the following: a total number of outstanding service requests; a number of outstanding service requests transmitted to a predetermined resource provider system 110; a number of outstanding service requests transmitted to a predetermined group of resource servers 112 (e.g., to resource servers 112 in a predetermined geographic region of the world); a number of outstanding service requests for a predetermined type of service; a number of outstanding service requests to a predetermined group of resource servers 112 for a predetermined type of service (e.g., to resource servers 112 in a predetermined geographic region of the world for a predetermined type of service); a number of outstanding service requests to each API of a predetermined resource provider system 110; a number of outstanding service requests to each API of a predetermined resource provider system 110 in a predetermined geographic region of the world.

In certain embodiments, the monitoring component 220 is configured to weigh different types of service requests differently from one another in the calculated numbers. For example, a first type of service request (e.g., service requests for accessing data) may be more highly valued than a second type of service request (e.g., service requests for status queries), so each outstanding service request of the first type may be calculated as corresponding to a predetermined number (e.g., two, three, or more) of "units" while each outstanding service request of the second type may be calculated as corresponding to a single "unit."

In certain embodiments, the analysis component 230 is operatively coupled to the monitoring component 220 and to the storage device 210 so that the analysis component 230 can access the information obtained by the monitoring component 220 and the failure parameters 212 from the storage device 210. For example, the analysis component 230 can receive at least some of the information from the monitoring component 220 and at least some of the one or more failure parameters from the storage device 210. The analysis component 230 can be configured to compare the information obtained by the monitoring component 220 regarding the outstanding service requests (e.g., the calculated one or more numbers of service requests in the one or more categories) to the one or more failure parameters 212 (e.g., corresponding to the one or more categories) and to determine whether at least one failure condition exists.

The analysis component 230, in some embodiments, may include software code that, when executed (e.g., by the one or more computer processors 215), instructs a computer device to perform the operations of the analysis component 230 as described herein. For example, the analysis component 230 can be manifested in computer code which, when executed by a processor (e.g., of the server 104) receives at least one calculated number from the monitoring component 220, receives at least one corresponding failure parameter 212 from the storage device 210, compares the at least one calculated number to the at least one corresponding failure parameter 212, and determines whether at least one failure condition corresponding to the at least one failure parameter 212 exists. In certain embodiments, the computer code manifesting the analysis component 230 can be "orthogonal" to the software corresponding to the operation of the server 104 (e.g., the code does not change the logic of the software corresponding to the operation of the server 104; the code can be non-intrusive) and/or can be packaged as a portion of a library that can be accessed by any server 104 of the first computer system 102.

In certain embodiments, the analysis component 230 is configured to compare one or more numbers of the outstanding service requests from the monitoring component 220 in one or more different categories to the corresponding maximum numbers for these one or more different categories. For example, the analysis component 230 can make one or more of the following comparisons: a total number of outstanding service requests to the total maximum number of service requests that can be simultaneously handled by the at least one server; a number of outstanding service requests transmitted to a predetermined resource provider system 110 to the maximum number of outstanding service requests to the predetermined resource provider system 110; a number of outstanding service requests transmitted to a predetermined group of resource servers 112 (e.g., to resource servers 112 in a predetermined geographic region of the world) to the maximum number of outstanding service requests to the predetermined group of resource servers 112; a number of outstanding service requests for a predetermined type of service to the maximum number of outstanding service requests for the predetermined type of service; a number of outstanding service requests to a predetermined group of resource servers 112 for a predetermined type of service (e.g., to resource servers 112 in a predetermined geographic region of the world for a predetermined type of service) to the maximum number of outstanding service requests to the predetermined group of resource servers 112 for the predetermined type of service; a number of outstanding service requests to each API of a predetermined resource provider system 110 to the maximum number of outstanding service requests to each API of the predetermined resource provider system 110; a number of outstanding service requests to each API of a predetermined resource provider system 110 in a predetermined geographic region of the world to the maximum number of outstanding service requests to each API of the predetermined resource provider system 110 in the predetermined geographic region of the world.

For another example, the analysis component 230 can compare a total number of service requests awaiting responses in a category of service requests to the total maximum number of service requests in the category of service requests that can be simultaneously handled by the at least one server 104. For example, the analysis component 230 can make one or more of the following comparisons: a percentage of the outstanding service requests that are transmitted to a predetermined resource provider system 110 to the maximum percentage of outstanding service requests to the predetermined resource provider system 110; a percentage of the outstanding service requests that are transmitted to a predetermined group of resource servers 112 (e.g., to resource servers 112 in a predetermined geographic region of the world) to the maximum percentage of outstanding service requests to the predetermined group of resource servers 112; a percentage of the outstanding service requests that are transmitted for a predetermined type of service to the maximum percentage of outstanding service requests for the predetermined type of service; a percentage of the outstanding service requests that are transmitted to a predetermined group of resource servers 112 for a predetermined type of service (e.g., to resource servers 112 in a predetermined geographic region of the world for a predetermined type of service) to the maximum percentage of outstanding service requests to the predetermined group of resource servers 112 for the predetermined type of service; a percentage of the outstanding service requests that are transmitted to each API of a predetermined resource provider system 110 to the maximum percentage of outstanding service requests to each API of the predetermined resource provider system 110; a percentage of the outstanding service requests that are transmitted to each API of a predetermined resource provider system 110 in a predetermined geographic region of the world to the maximum percentage of outstanding service requests to each API of the predetermined resource provider system 110 in the predetermined geographic region of the world. In certain other embodiments, a ratio of the number of outstanding service requests in a category to the maximum number of the total outstanding service requests transmitted by the server 104 can be compared to a maximum ratio for the category.

The analysis component 230 can determine, in response to one or more of the comparisons performed by the analysis component 230, whether at least one failure condition exists. For example, a failure condition can be deemed to exist if the number of outstanding service requests in a category is equal to or greater than the corresponding failure parameter for the category. In certain embodiments, the analysis component 230 flags a failure condition in a category as existing upon the number of outstanding service requests in the category being equal to or greater than the corresponding failure parameter for the category. The analysis component 230 can also send a signal to the first computer system 102 and/or a second computer system 108) indicative of the failure condition in a category as existing (e.g., a failure signal sent to a browser running on a second computer system 108; triggering an alarm or notice being transmitted to operators of the resource provider system 110). The analysis component 230 of certain embodiments can also log various metrics of when one or more failure conditions occur, for potential use in solving problems of the at least one resource provider system 110.

The analysis component 230 of certain such embodiments can recognize that one or more failure conditions exists. For example, the analysis component 230 can recognize that one or more of the following failure conditions exists: traffic to resource servers 112 in a whole geographic region of the world is compromised, regardless of which type of service is being requested; service requests to all APIs of a particular resource provider system 110 are misbehaving, either globally (e.g., in all geographic regions) or in a particular geographic region; services requests to a particular API of a particular network provider system 110 are getting stuck, either globally (e.g., in all geographic regions) or in a particular geographic region.

In certain embodiments, the throttling component 240 is operatively coupled to the analysis component 230 and to the at least one server 104 so that the throttling component 240 can access the determinations made by the analysis component 230 and can selectively throttle (e.g., selectively inhibit) transmission of selected service requests by the at least one server 104. For example, the throttling component 240 can selectively inhibit transmission of selected service requests by selectively slowing down some or all of the selected service requests from being transmitted by the at least one server 104 (e.g., by holding some or all of the selected service requests in a queue to be transmitted at a later time). For another example, the throttling component 240 can selectively inhibit transmission of selected service requests by selectively blocking some or all of the selected service requests from being transmitted by the at least one server 104. The throttling component 240 of certain embodiments can be operative to prevent service requests corresponding to the at least one failure condition from being transmitted by the at least one server 104 while the at least one failure condition exists. For example, upon a failure condition of a category being determined by the analysis component 230 as existing, the throttling component 240 is configured to throttle (e.g., inhibit, prevent) subsequent service requests in the category from being transmitted from the at least one server 104 being monitored by the failure monitoring system 230. The throttled service requests can be transmitted to the second computer system 108 as errors, can be queued for being retried after a predetermined period of time, or can be otherwise dealt with to unburden the at least one server 104 of the first computer system 102.

The throttling component 240, in some embodiments, may include software code that, when executed (e.g., by the one or more computer processors 215), instructs a computer device to perform the operations of the throttling component 240 as described herein. For example, the throttling component 240 can be manifested in computer code which, when executed by a processor (e.g., of the server 104) receives the determinations made by the analysis component 230 regarding whether at least one failure condition exists and throttles (e.g., selectively inhibits) transmission of service requests corresponding to the existing failure condition by the at least one server 104 while the failure condition exists. In certain embodiments, the computer code manifesting the throttling component 240 can be "orthogonal" to the software corresponding to the operation of the server 104 (e.g., the code does not change the logic of the software corresponding to the operation of the server 104) and/or can be packaged as a portion of a library that can be accessed by any server 104 of the first computer system 102.

In certain embodiments, the throttling component 240 is configured to selectively inhibit transmission of service requests in one or more categories which are identified as experiencing a failure condition. For example, the throttling component 240 can selectively inhibit transmission of service requests in one or more of the following categories, upon the corresponding failure condition existing: all service requests (e.g., the total maximum number of outstanding service requests has been reached); service requests transmitted to a predetermined resource provider system 110 (e.g., the maximum number of outstanding service requests to the predetermined resource provider system 110 has been reached); service requests transmitted to a predetermined group of resource servers 112 (e.g., to resource servers 112 in a predetermined geographic region of the world) (e.g., the maximum number of outstanding service requests to the predetermined group of resource servers 112 has been reached); service requests for a predetermined type of service (e.g., the maximum number of outstanding service requests for the predetermined type of service has been reached); service requests to a predetermined group of resource servers 112 for a predetermined type of service (e.g., to resource servers 112 in a predetermined geographic region of the world for a predetermined type of service) (e.g., the maximum number of outstanding service requests to the predetermined group of resource servers 112 for the predetermined type of service has been reached); service requests to each API of a predetermined resource provider system 110 (e.g., the maximum number of outstanding service requests to each API of the predetermined resource provider system 110 has been reached); service requests to each API of a predetermined resource provider system 110 in a predetermined geographic region of the world (e.g., the maximum number of outstanding service requests to each API of the predetermined resource provider system 110 in the predetermined geographic region of the world has been reached).

FIG. 3 is a flow diagram of an example computer-implemented failure monitoring method 300 compatible with certain embodiments described herein. The method 300 can be configured to be used in conjunction with a first computer system 102 having at least one server 104 and configured to communicate with a plurality of second computer systems 108 (e.g., via a network 106) and with at least one resource provider system 110. The at least one resource provider system 110 can have a plurality of resource servers 112 configured to provide one or more services to the first computer system 102.

In an operational block 310, the method 300 comprises storing one or more failure parameters 112 that are indicative of one or more failure conditions. In an operational block 320, the method 300 further comprises obtaining information regarding service requests transmitted by the at least one server 104 to the at least one resource provider system 110 for which corresponding responses have not been timely received by the at least one server 104 from the at least one resource provider system 110 (e.g., outstanding service requests). In an operational block 330, the method 300 further comprises comparing the information to the one or more failure parameters. In an operational block 340, the method 300 further comprises determining, in response to the comparison, whether at least one failure condition exists. In an operational block 350, the method 300 further comprises inhibiting (e.g., selectively throttling) transmission of service requests corresponding to the at least one failure condition by the at least one server 104 while the at least one failure condition exists.

By selectively throttling service requests in one or more categories which are identified as experiencing a failure condition, certain embodiments described herein can advantageously allow other service requests to be transmitted, thereby protecting the at least one server 104 of the first computer system 102 from being brought down by a single malfunctioning resource server 112, despite its importance to the overall operation of the first computer system 102. This protection can be referred to as being tiered, since it focuses on only service requests in the problematic category or tier. Certain embodiments described herein can advantageously protect the first computer system 102 (e.g., a website) and the at least one server 104 (e.g., at least one webserver) and ensure that it has enough capacity (e.g., free slots for outstanding service requests) to process service requests in categories that are not experiencing difficulties (e.g., one or more failure conditions). While resource servers 112 in bad geographic regions or resource servers 112 providing bad services or APIs may cause operating issues for users of the second computer systems 108, the first computer system 102 can advantageously remain operative and responsive, able to process service requests to resource servers 112 in good geographic regions and resource servers 112 providing good services and APIs. Rather than focusing on throttling inbound requests (e.g., rate limiting inbound requests) from users, certain embodiments described herein advantageously focus on the outbound service requests from the first computer system 102. In this way, certain embodiments described herein can keep track of how many service requests are going to each service and can automatically fail service requests which exceed the allowed capacity to prevent a geographic region, service, or API of the resource provider system 110 from using up all the available service request connections and to allow other traffic to proceed.

Embodiments of the disclosure are described herein with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described. Further, although various aspects of the disclosure will be described with regard to illustrative examples and embodiments, it can be appreciated that the disclosed embodiments and examples should not be construed as limiting. For example, although the present application will be discussed with respect to certain computing devices, it can be appreciated that the systems, components, and methods described may be applied to any computing device that may share resources within a network.

All of the processes described herein and/or depicted in the attached figures may be embodied in, and fully automated via software code modules executed by one or more general purpose computers or processors and should be understood as potentially representing modules, segments, or portions of code, which include one or more executable instructions for implementing specific logical functions or elements in the process. The data, components, and/or code modules may be stored in any type of non-transitory computer-readable medium or other computer storage device and loaded into memory of a computing device using a drive mechanism associated with computer readable storage of the computer executable components, such as a CD-ROM, DVD-ROM, or network interface. Furthermore, the data, components, and/or code modules can be included in a single device or distributed in any manner. Some or all the methods may alternatively be embodied in specialized computer hardware. In addition, the components referred to herein may be implemented in hardware, software, firmware or a combination thereof.

Alternate implementations are included within the scope of the embodiments described herein in which elements or functions may be deleted, executed out of order from that shown, or discussed, including substantially concurrently or in reverse order, depending on the functionality involved as would be understood by those skilled in the art. Accordingly, general purpose computing devices may be configured to implement the processes, algorithms and methodology of the present disclosure with the processing and/or execution of the various data and/or components described above.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase 'at least one of X, Y and Z,'" unless specifically stated otherwise, is to be understood with the context as used in general to convey that an item, term, etc. may be either X, Y or Z, or some combination thereof. Thus, such conjunctive language is not generally intended to imply that certain embodiments require at least one of X, at least one of Y and at least one of Z to each be present.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented failure monitoring system configured to be used with a server that is configured to communicate via a network with a plurality of user computer systems, that is configured to transmit a plurality of service requests to a plurality of resource servers, and that is configured to receive a corresponding plurality of responses from the resource servers, the computer-implemented failure monitoring system comprising:
   a computer storage device operative to store one or more failure parameters that are indicative of one or more failure conditions experienced by the server due to service requests in one or more categories of service requests and for which responses are not timely received by the server from the resource servers, the one or more categories of service requests comprising one or more of the following categories: service requests transmitted to a resource provider system; service requests transmitted to a group of resource servers of the plurality of resource servers; service requests for a type of service; service requests to a group of resource servers of the plurality of resource servers for a type of service; service requests to each application programming interface (API) of a resource provider system; and
   one or more computer processors comprising:
      a monitoring component operative to calculate one or more numbers of service requests transmitted by the server to the resource servers for which corresponding responses have not been timely received by the server from the resource servers, the calculated one or more numbers of service requests corresponding to the one or more categories of service requests;
      an analysis component operative to compare the calculated one or more numbers of service requests to the one or more failure parameters corresponding to the one or more categories of service requests and to determine whether at least one failure condition exists; and
      a throttling component operative to selectively inhibit transmission of service requests corresponding to the at least one failure condition by the server while the at least one failure condition exists.

2. The computer-implemented failure monitoring system of claim 1, wherein the computer storage device and the one or more computer processors are within the server.

3. The computer-implemented failure monitoring system of claim 1, wherein the one or more failure parameters includes a maximum number of outstanding service requests transmitted by the server in the one or more categories, the one or more numbers of service requests includes a total number of outstanding service requests in the one or more categories of service requests transmitted by the server, and the at least one failure condition includes the total number of outstanding service requests in the one or more categories of service requests transmitted by the server being equal to or exceeding the maximum number of outstanding service requests in the one or more categories of service requests transmitted by the server.

4. The computer-implemented failure monitoring system of claim 3, wherein the throttling component inhibits subsequent service requests in the one or more categories of service requests from being transmitted by the server while the total number of outstanding service requests in the one or more categories of service requests transmitted by the server is equal to or exceeding the maximum number of outstanding service requests in the one or more categories of service requests transmitted by the server.

5. A computer-implemented failure monitoring system configured to be used with a first computer system having at least one server, the first computer system configured to communicate with a plurality of second computer systems and with at least one resource provider system having a plurality of resource servers and configured to provide one or more services to the first computer system, the computer-implemented failure monitoring system comprising:
- a computer storage device operative to store one or more failure parameters that are indicative of one or more failure conditions; and
- one or more computer processors implementing:
  - a monitoring component operative to obtain information regarding service requests in one or more categories of service requests transmitted by the at least one server to the at least one resource provider system for which corresponding responses have not been timely received by the at least one server from the at least one resource provider system;
  - an analysis component operative to compare the information to the one or more failure parameters and to determine whether at least one failure condition exists; and
  - a throttling component operative to selectively inhibit transmission by the at least one server of service requests in the one or more categories corresponding to the at least one failure condition while the at least one failure condition exists, the one or more categories comprising at least one of the following categories: service requests transmitted to a resource provider system; service requests transmitted to a group of resource servers of the plurality of resource servers; service requests for a type of service; service requests to a group of resource servers of the plurality of resource servers for a type of service; service requests to each application programming interface (API) of a resource provider system.

6. The computer-implemented failure monitoring system of claim 5, wherein the first computer system is configured to communicate with the plurality of second computer systems and with the at least one resource provider system via a network.

7. The computer-implemented failure monitoring system of claim 5, wherein the at least one server is programmed to simultaneously handle a maximum number of service requests in the one or more categories, and wherein at least one failure parameter of the one or more failure parameters equals the maximum number of service requests in the one or more categories.

8. The computer-implemented failure monitoring system of claim 5, wherein the one or more failure parameters comprise a maximum number of total outstanding service requests that can be handled simultaneously by the at least one server.

9. The computer-implemented failure monitoring system of claim 5, wherein the one or more failure parameters comprise one or more of the following: a maximum number of outstanding service requests transmitted by the at least one server to a predetermined resource provider system; a maximum number of outstanding service requests transmitted by the at least one server to a predetermined group of resource servers; a maximum number of outstanding service requests transmitted by the at least one server for a predetermined type of service; a maximum number of outstanding service requests transmitted by the at least one server to a predetermined group of resource servers for a predetermined type of service; a maximum number of outstanding service requests transmitted by the at least one server to each application programming interface (API) of a predetermined resource provider system; a maximum number of outstanding service requests transmitted by the at least one server to each API of a predetermined resource provider system in a predetermined geographic region of the world.

10. The computer-implemented failure monitoring system of claim 5, wherein a maximum number of total outstanding service requests that can be handled simultaneously by the at least one server equals a total capacity of the at least one server, and the one or more failure parameters comprise one or more of the following: a maximum percentage of the total capacity of the at least one server going to a predetermined resource provider system; a maximum percentage of the total capacity of the at least one server going to a predetermined group of resource servers; a maximum percentage of the total capacity of the at least one server for a predetermined type of service; a maximum percentage of the total capacity of the at least one server going to a predetermined group of resource servers for a predetermined type of service; a maximum percentage of the total capacity of the at least one server going to each application programming interface (API) of a predetermined resource provider system; a maximum percentage of the total capacity of the at least one server going to each API of a predetermined resource provider system in a predetermined geographic region of the world.

11. The computer-implemented failure monitoring system of claim 5, wherein at least some of the failure parameters have values that are dynamically set in response to one or more of the following: performance of the at least one resource provider system; performance of the first computer system; performance of a network across which the first computer system transmits the service requests; the number of second computer systems using the first computer system; the types of services being requested.

12. The computer-implemented failure monitoring system of claim 5, wherein the monitoring component is configured to detect service requests transmitted from the at least one server to the at least one resource provider system and corresponding responses received by the at least one server.

13. The computer-implemented failure monitoring system of claim 5, wherein the information obtained by the monitoring component includes one or more of the following: a type of service being requested by a service request; an identity of the resource provider system to which a service request was sent; an identity of the one or more resource servers to which a service request was sent; an identity of a predetermined group of resource servers to which a service request was sent; an identity of a geographic region of the world in which resides the resource servers to which a service request was sent; an identity of an application programming interface (API) of the resource provider system to which a service request was sent.

14. The computer-implemented failure monitoring system of claim 5, wherein the monitoring component is configured to calculate one or more numbers of the service requests transmitted by the at least one server in the one or more categories for which corresponding responses have not yet been received by the at least one server.

15. The computer-implemented failure monitoring system of claim 14, wherein the monitoring component is configured to weigh different types of service requests differently from one another in the calculated one or more numbers.

16. The computer-implemented failure monitoring system of claim 5, wherein the analysis component is configured to compare a total number of service requests awaiting responses to the total maximum number of service requests that can be simultaneously handled by the at least one server.

17. The computer-implemented failure monitoring system of claim 5, wherein the analysis component is configured to compare a total number of service requests awaiting responses in the one or more categories of service requests to a total maximum number of service requests in the one or more categories of service requests that can be simultaneously handled by the at least one server.

18. The computer-implemented failure monitoring system of claim 17, wherein the analysis component is configured to determine whether at least one failure condition exists upon the total number of service requests awaiting response in the one or more categories of service requests is equal to or exceeding the total maximum number of service requests in the one or more categories of service requests that can be simultaneously handled by the at least one server.

19. The computer-implemented failure monitoring system of claim 5, wherein the throttling component is configured to, upon a failure condition of the one or more categories of service requests being determined by the analysis component as existing, throttle subsequent service requests in the one or more categories from being transmitted from the at least one server.

20. The computer-implemented failure monitoring system of claim 5, wherein the throttling component is configured to, upon a corresponding failure condition existing, selectively throttle service requests in the one or more categories.

21. A computer-implemented method for use with a first computer system having at least one server, the first computer system configured to communicate with a plurality of second computer systems and with at least one resource provider system having a plurality of resource servers configured to provide one or more services to the first computer system, the computer-implemented method comprising:
   storing one or more failure parameters that are indicative of one or more failure conditions;
   obtaining information regarding service requests transmitted by the at least one server to the at least one resource provider system in one or more categories of service requests for which corresponding responses have not been timely received by the at least one server from the at least one resource provider system, the one or more categories comprising at least one of the following categories: service requests transmitted to a resource server of the plurality of resource servers; service requests transmitted to a group of resource servers of the plurality of resource servers; service requests for a type of service; service requests to a group of resource servers of the plurality of resource servers for a type of service; service requests to each application programming interface (API) of the at least one resource provider system;
   comparing the information to the one or more failure parameters;
   determining, in response to the comparison, whether at least one failure condition exists; and
   inhibiting transmission of service requests corresponding to the at least one failure condition by the at least one server while the at least one failure condition exists.

22. The computer-implemented method of claim 21, wherein inhibiting transmission of service requests comprises selectively throttling service requests in the one or more categories of service requests for which the at least one failure condition exists.

* * * * *